United States Patent [19]

Maeda

[11] Patent Number: 5,337,295

[45] Date of Patent: Aug. 9, 1994

[54] DIGITAL AUDIO SIGNAL REPRODUCING APPARATUS

[75] Inventor: Yasuaki Maeda, Tokyo, Japan

[73] Assignee: Sony Corporation, Japan

[21] Appl. No.: 886,035

[22] Filed: May 19, 1992

[30] Foreign Application Priority Data

May 25, 1991 [JP] Japan .................................. 3-149367

[51] Int. Cl.⁵ .................... G11B 19/20; G11B 27/10
[52] U.S. Cl. ......................................... 369/32; 360/32; 369/47; 369/54
[58] Field of Search ................. 369/13, 32, 33, 48, 369/47, 49, 54, 59, 60, 124; 360/32, 59, 114

[56] References Cited

U.S. PATENT DOCUMENTS

| | | | |
|---|---|---|---|
| 4,788,685 | 11/1988 | Sako et al. | 369/32 X |
| 4,796,247 | 1/1989 | Vogelsang | 369/44.28 |
| 4,893,293 | 1/1990 | Endo et al. | 369/34 |
| 5,191,573 | 3/1993 | Hair | 369/34 X |
| 5,224,087 | 6/1993 | Maeda et al. | 369/54 |
| 5,243,588 | 9/1993 | Maeda et al. | 369/54 |

FOREIGN PATENT DOCUMENTS 0384073 8/1990 European Pat. Off. .
2136192 9/1984 United Kingdom .

Primary Examiner—Tony M. Argenbright
Attorney, Agent, or Firm—Limbach & Limbach

[57] ABSTRACT

A digital audio signal reproducing apparatus is adapted for reproducing digital audio data at a constant data rate by reading digital audio signals recorded on a recording medium after bit compression, in which the compressed data are read out from the recording medium and written in the memory when the volume of the non-read-out data in the memory becomes lower than a predetermined volume. The reading out of data from the memory is discontinued when it becomes impossible to write data in the memory in order to establish a standby state by way of performing a memory control. Upon actuation of a pause key, the reading out of data from the memory is discontinued. Upon releasing the actuation of the pause key, the readout operation from the memory is re-initiated. Even when the reading out of the recording data from the recording medium proceeds such that data can no longer be written in the memory, the reading out of data from the recording medium is discontinued by the above-described memory control for establishing the standby state if the pause key is actuated. Since audio playback is restarted on releasing the pause key, data playback is initiated instantaneously.

15 Claims, 4 Drawing Sheets

DIGITAL AUDIO SIGNAL REPRODUCING APPARATUS

BACKGROUND OF THE INVENTION

1. Field of the Invention

This invention relates to a digital audio signal reproducing apparatus in which compressed data of digital audio signals recorded of a recording medium is read out from the recording medium and written in a memory so as to be read out from the memory at a constant data rate.

2. Description of the Related Art

The present Assignee has proposed a technique of bit compressing input digital audio signals and recording the data of a predetermined data volume as a recording unit in a burst-like manner.

With this technique, a magneto-optical disc is used as a recording medium for recording and/or reproducing adaptive differential (AD) PCM audio data as prescribed in e.g. CD-I (CD-Interactive) or CD-ROM XA audio data formats, or digital audio data encoded with bit compression in accordance with other formats than those given above. The bit-compressed digital audio data are recorded sector-sequentially and intermittently, that is, in a burst-like manner, with addition of linking sectors before and after each recording unit of a predetermined data volume, such as 32 sectors, to account for interleaving with the data of neighboring sectors.

It is now assumed that data of a so-called standard compact-disc (CD) format (CD-DA format) or so-called straight PCM audio data produced upon simple linear quantization of analog audio signals, are recorded and/or reproduced with approximately ¼ bit compression. The play time of a disc on which data are recorded with approximately ¼ bit compression is approximately 4 times the time necessary for recording the straight PCM data prior to bit compression, such as the above-mentioned CD-DA format data. Since the recording/play time approximately equal to that in the case of a standard 12 cm CD may be achieved with a disc of a smaller size, the apparatus may be reduced in size. On the other hand, by setting the instantaneous bit rate for recording/reproduction so as to be equal to that of the above-mentioned standard CD-DA format, the time necessary for recording/reproduction may be reduced to about ¼ of the time, so that the remaining ¾ of the time may be allocated to so-called retry or the like operations. These operations include a verification operation, which verifies if recording has been made regularly, or a rewriting operation in case of a recording failure, as far as data recording is concerned, and a re-reading operation in case of a high data read error rate, as far as data reproduction is concerned. This system may be advantageously employed for a portable small-sized apparatus because recording/reproduction may be achieved more reliably even under adverse conditions of defocusing or detracking due to vibrations of the mechanical components caused by disturbances.

For recording/reproduction of bit compressed digital audio data to a volume ¼ of the original data, a buffer memory for recording/reproducing the compressed data is required. The compressed data is written continuously at a constant rate during recording and read out intermittently (in a burst fashion) at a rate about four times the write rate. The data volume read out intermittently each time is e,g. 32 sectors. As described above, several linking sectors are added before and after these 32 sectors and the resulting recording unit is recorded on the disc in spatial continuation to the preceding recording unit. During reproduction, the data volume of the above-mentioned recording unit, consisting of the 32 sectors and several linking sectors before and after the 32 sectors, is intermittently reproduced from the disc at a read-out rate about four times the write rate, and the linking sectors before and after the 32 sectors are removed before the data are written in the buffer memory. It is from this memory that the compressed data is read out continuously at the above-mentioned constant rate.

The total storage capacity ($M_T$) of the above-mentioned recording and/or reproducing buffer memory, is equal to the sum of the data volume of the compressed data written in and not read from the buffer memory (volume of non-read-out data) and the remaining storage capacity of the buffer memory, that is the volume of the data that can be written in the buffer memory without destructing the non-read-out data (volume of writable data). The following is an explanation of the controlling of data writing and read-out in or from the memory.

This controlling is made such that, during recording, the compressed data is written at a constant data rate into the buffer memory and, when the volume of the non-read-out data exceeds a predetermined volume $M_K$, data is read out in a burst-like manner for each recording unit consisting of, for example, 32 sectors plus several sectors, at a readout rate faster than the data write rate, so as to be recorded on a recording medium, such as a disc. Data not recorded as yet on the recording medium represents the non-read-out data on the memory. If the recording on the recording medium is interrupted by disturbances, such as vibrations, or if recording has not been made normally, the volume of non-read-out data in the memory is not decreased, such that, if the volume of the non-read-out data is close to the total storage capacity $M_T$ of the memory, the non-read-out data may be destroyed by the compressed data written at a constant rate. In view of this consideration, recording on the recording medium is carried out under a condition in which the writable capacity in the buffer memory is below ($M_T - M_K$), that is in which there is a certain allowance in the storage capacity of the writable area, so that destruction of the non-read-out data may be inhibited even in cases wherein recording on the recording medium is interrupted or is not carried out in a regular manner. It suffices to set ($M_T - M_K$) so that a time interval which would be required for reversion to the state of recording on the recording medium from the state of recording interruption and for re-recording is presupposed and the operation of writing the compressed data on the memory may be continued during this presupposed time interval.

The controlling during reproduction is so made that, while the compressed data, read out in a burst-like manner from the recording medium, is written in the memory so as to be read at a constant data rate, the non-read-out data is read out from the recording medium in a burst-like manner so as to be written in the memory when the data volume of the non-read-out data becomes less than the predetermined data volume $M_L$. Accordingly, even if data readout from the recording medium cannot be made in a regular manner due to disturbances or the like, the remaining data volume $M_L$ may be continuously read to prevent data reproduction from being interrupted due to interruption of the read-out operation at the constant rate. It suffices to set the non-read-out data volume $M_L$ so that the compressed data may be continuously read at the above-mentioned constant rate from the memory at the above-mentioned constant data rate for a time required for re-reading the recording data from the recording medium.

Meanwhile, in a so-called CD (compact disc) player, there is frequently provided a pause function for transiently discontinuing the playback operation, an error selecting and reproducing function for selecting an error and reproducing the selected error, a one/all repeat function for repeatedly reproducing one or all of the errors of the disc, or an A/B repeat function of repeatedly reproducing from an arbitrary point A to another arbitrary point B, for thereby making the best use of accessibility proper to the disc. By taking advantage of these functions, not only is the operating labor dispensed with, but a more versatile domain of audio entertainment may be achieved.

If these functions are to be annexed to the recording-/reproducing apparatus or reproduce-only apparatus for compressed data as described above, a time lag is produced between the audio signals being reproduced and audio signals being read from the disc, due to the use of the buffer memory for reproduction, thus presenting response problems. Besides, a simplified arrangement for annexation of these functions is preferred.

OBJECT AND SUMMARY OF THE INVENTION

In view of the above described state of the art, it is an object of the present invention to provide a digital audio signal reproducing apparatus whereby the above mentioned pause function of transiently discontinuing the playback operation may be realized by a simplified arrangement.

According to the present invention, there is provided a digital audio signal reproducing apparatus for reproducing digital audio data at a constant data rate by reading digital audio signals recorded on a recording medium after bit compression, in which the compressed data is read out from the recording medium and written in the memory when the volume of non-read-out data in the memory becomes lower than a predetermined volume, and the data readout from the memory is discontinued when it becomes impossible to write data in the memory. Thus a standby state is established, by way of memory control, so that, on actuation of a pause key, data readout from the memory is discontinued and, on releasing the actuation of the pause key, data readout from the memory is re-initiated.

In this manner, on actuation of the pause key, data reproduction is discontinued by discontinuing data readout from the memory. Even when readout of the recording data from the recording medium proceeds such that data can no longer be written in the memory, data readout from the recording medium is discontinued to establish the standby state by the above-described memory control. Since audio reproduction is re-initiated on releasing the actuation of the pause key, data writing in the memory is enabled to re-initiate data reproduction instantaneously.

Other objects and advantages of the present invention will become apparent from the following description.

DETAILED DESCRIPTION OF THE PREFERRED EMBODIMENTS

Figure 1:
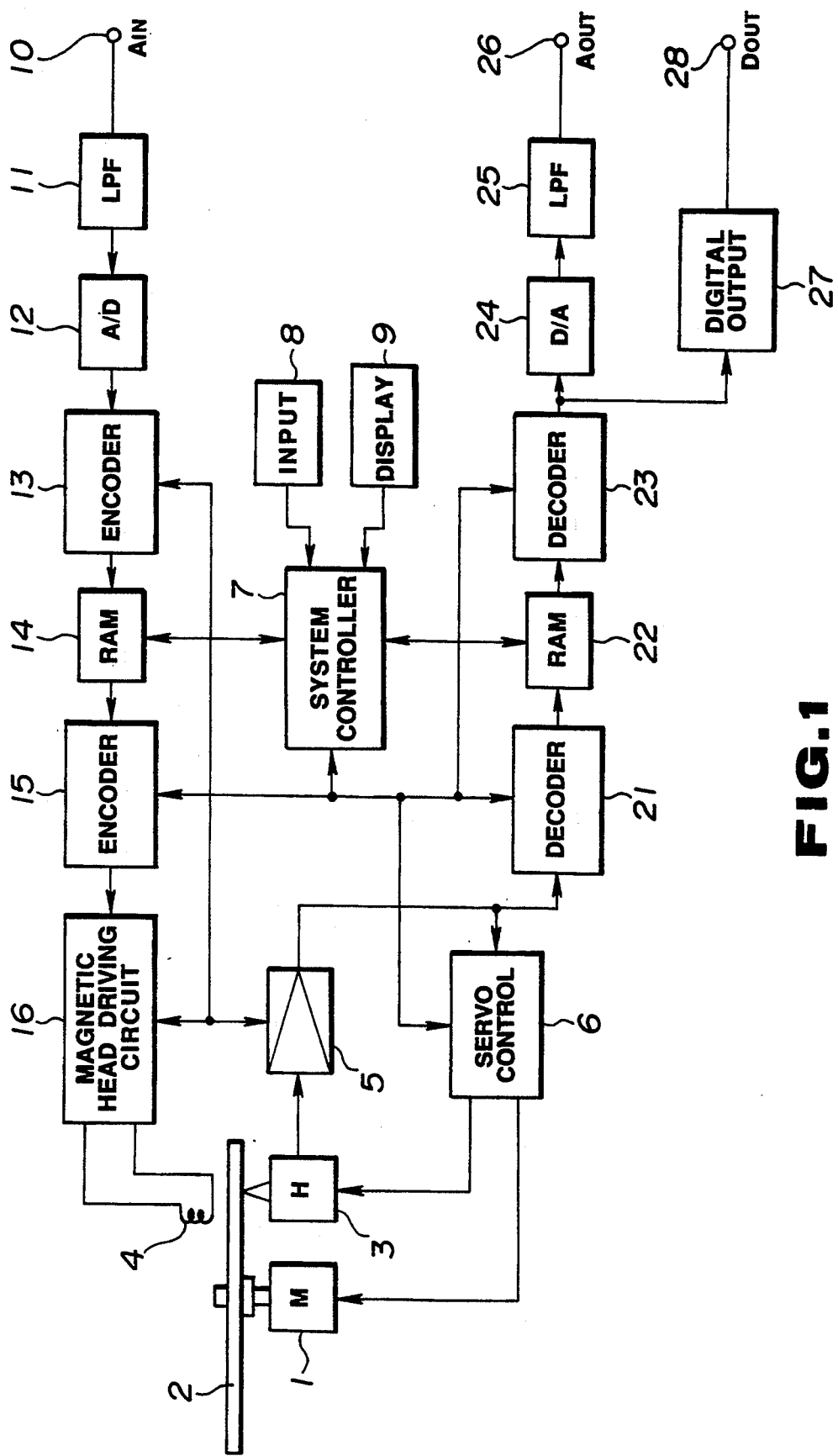
FIG. 1 is a block circuit diagram showing an arrangement of a disc recording/reproducing apparatus as an embodiment of a digital audio signal reproducing apparatus according to the present invention.

FIG. 1 shows, in a schematic block circuit diagram, a disc recording/reproducing apparatus as an embodiment of a digital audio signal reproducing apparatus according to the present invention.

In this figure, bit-compressed digital audio signals are recorded on a recording medium, such as an optical disc 2. These recording signals are read in a burst-like manner at an interval of a predetermined recording unit of, for example, 32 plus several sectors, to produce the bit-compressed audio data in a decoder 21 adapted for descrambling and error correction or decoding. These compressed data are written in a memory 22, such as a random access memory (RAM), from which the compressed data are read at another predetermined data rate and processed by a decoder 23 for bit expansion and decoding for reproducing audio signals.

Meanwhile, the controlling of the writing operation of the compressed data in memory 22 is so made that, when the data volume in memory 22 is less than a predetermined volume, the compressed data are read out from the recording medium, such as an optical disc 2, so as to be written in the memory 22, and the data are continuously read and written as long as there are a vacant area in memory 22 for data writing. If the vacant area becomes less than a predetermined value, so that data can no longer be written, that is when the memory is substantially devoid of vacant area, data read-out from the recording medium is discontinued. At this time, the optical head 3 may continue to trace the same track on the optical disc 2 or may remain at a standby state at the next reading position.

If, in an apparatus in which writing control on the memory 22 is performed in this manner, a pause key (temporary halt key) is operated in a key input 8, a system controller 7, such as a CPU, discontinues the read-out operation from memory 22. Thus the audio signals cease to be outputted from an analog output terminal 26 instantaneously responsive to the key input to establish a muted state. If the compressed data are read out at this time from the recording medium, such as optical disc 2, so as to be written in the memory 22, the data read-out operation from the recording medium, such as the optical disc 2, is automatically discontinued when the vacant area in the memory 22 is less than the above-mentioned constant value, and a standby state is established, so that pause control is realized inclusive of servo and control systems. If a pause release operation is performed at the key input 8, system controller 7 re-initiates reading from memory 22. Audio signals are outputted in this manner instantaneously at the analog output terminal 26 responsive to the key input. Meanwhile, the D/A converter 24, the low-pass filter 25 etc. may be controlled to the muting state during the above-described pause operation.

In this manner, by taking advantage of the function inherent in the disc recording/reproducing apparatus, the playback sound may be muted instantaneously responsive to the pause key actuation, by a simplified operation of halting the readout of the compressed data from memory 22 responsive to the pause operation.

The arrangement shown in FIG. 1 is hereinafter explained in detail.

An optical disc 2, rotationally driven by a spindle motor 1, may be for example, be a recordable disc, such as a magneto-optical disc. However, for a reproduce-only disc, an optical disc of an aluminum reflecting film type, similar to a conventional compact disc (CD), may be employed. An optical head 3 for recording/reproducing data on or from the optical disc which, in the following description, is a magneto-optical disc, is provided with a laser light source, such as a laser diode, optical components, such as a collimator lens, an object lens, a polarization beam splitter or a collimator lens and photodetectors having light receiving parts of a predetermined pattern. The optical head 3 is provided facing the magnetic head 4 with the magneto-optical disc 2 in-between. For recording data on the magneto-optical disc 2, the magnetic head 4 is driven by a head driving circuit 16 of the recording system as later explained for impressing a magnetic field modulated signal in accordance with the recording data, while the laser light is radiated on a target track of the magneto-optical disc 2 by the optical head 3 for effecting thermomagnetic recording in accordance with the magnetic field modulation system. The optical head 13 also detects the laser light reflected back from the target track for detecting focusing errors and tracking errors by e.g. an astigmatic method and by the push-pull method, respectively. When reproducing data from the magneto-optical disc 2, the optical head 3 detects the focusing errors and the tracking errors, while detecting the difference in the deflection angle (Kerr rotation angle) of the reflected laser light from the target track for producing playback signals.

An output from the optical head 3 is supplied to an RF circuit 5. The RF circuit 5 extracts the focusing error signals and the tracking error signals from an output of the optical head 3 for supplying the extracted signals to a servo control circuit 6, while converting the reproduced signals into binary signals for supplying the produced binary signals to a decoder 21 of the reproducing system as later described.

The servo control circuit 6 includes a focusing servo circuit, a tracking servo circuit, a spindle motor servo control circuit and a thread servo control circuit. The focusing servo control circuit effects focusing servo control of the optical system of the optical head so that the focusing error signals will be reduced to zero. The tracking servo control circuit effects tracking servo control of the optical system of the optical head so that the tracking error signals will be reduced to zero. The spindle motor servo control circuit controls the spindle motor 1 for rotationally driving the magneto-optical disc 2 at a predetermined rotational velocity, such as at a predetermined linear velocity. The thread servo control circuit causes the optical head 3 and the magnetic head 4 to be displaced to a target track position of the magneto-optical disc 2 designated by system controller 6. The servo control circuit 6, performing these various controlling operations, transmits the information concerning the operating states of the components controlled by the servo control circuit 6 to system controller 7.

The key input 8 and a display 9 are connected to the system controller 7 controlling the recording system and the reproducing system under the operating mode designated by the input data by the key input 8. Among the functions achieved by the key operation, is a pause function for transiently stopping the playback operation, the automatic error selecting function for selecting and reproducing the desired error, a one/all repeat function for repeatedly reproducing one or all errors of the disc and the A/B repeat function of repeatedly reproducing from a desired point A to another desired point B. The system controller 7 also supervises the recording position and the reproducing position on the recording track being traced by the optical head 3 and the magnetic head 4 based on the sector-by-sector address information reproduced by header time or subcode Q-data from the recording track 2 of the magneto-optical disc 2. The information concerning the recording position or the playback position or the information concerning the function selected by the key operation is displayed, if need be, on the display 9.

The recording system of the disc recording/reproducing apparatus is hereinafter explained.

Analog audio input signals $A_{IN}$ from input terminal 10 are supplied via a low-pass filter 11 to an A/D converter 12. The A/D converter 12 quantizes the audio input signals $A_{IN}$ to produce digital audio signals which are supplied to an encoder 13 for high efficiency encoding, such as adaptive differential (AD) PCM. Digital audio signals from outside may also be supplied to the encoder 13 via a digital input interfacing circuit, not shown. The digital audio signals that enter into the encoder 13 are non-compressed PCM data, that is so-called straight PCM data and, as for example, PCM data having a sampling frequency of 44.1 kHz and 16 quantization bits, as in the case of the format for a standard compact disc (CD) format, or CD-DA format. The input audio PCM data are processed by encoder 13 by being subjected to high efficiency bit compression with approximately a ¼ bit rate.

The memory 14 is a buffer memory having data writing and readout controlled by system controller 7 and operated for transiently storing the bit-compressed data supplied from encoder 13 for subsequently recording on the disc as the occasion may demand. That is, in the above-mentioned ¼ bit compression mode, compressed data having the constant bit rate reduced to about ¼ of the standard data transfer rate (bit rate) is continuously written in memory 14. For recording the compressed data on the magneto-optical disc 2, the data is recorded in a burst-like manner at the same rotational velocity as that of the above-mentioned standard CD-DA format (constant linear velocity). That is, the time during which signals are actually recorded in the recording mode is about ¼ of the entire time, with the remaining ¾ of the time being the non-recording time. However, recording is effected on the magneto-optical disc 2 in continuation to the region in which recording has been made immediately before the non-recording time, so that the recording is continuous on the medium surface, In this manner, recording is made with the same recording pattern and the same recording density as those of, for example, the standard CD-DA format.

In this manner, the compressed data are read in a burst-like manner from the memory 14 at a bit rate corresponding to the data transfer rate of the above-mentioned standard CD-DA format. The read-out compressed data are transmitted to an encoder 15 for interleaving, error correction coding or 8-to-14 modulation. In a data string supplied from memory 14 to encoder 15, a cluster composed of a predetermined number of sectors, such as 32 sectors, represent a recording unit. After encoding, several sectors for cluster connection are appended to the one-cluster data. These cluster-linking sectors are of a length longer than the interleaving length at the encoder 15, so that data of neighboring clusters remain unaffected after interleaving.

The cluster-by-cluster recording will be explained later by referring to FIG. 2.

The recording data supplied from memory 14 in a burst-like manner as described above is processed in the encoder 15 by being subjected to encoding for error correction (parity appendage and interleaving) or EFM encoding. The recording data processed by the encoder 15 by being subjected to encoding is supplied to the magnetic head driving circuit 16. The magnetic head 4 is connected to the magnetic head driving circuit 16 and is thereby driven for impressing the modulated magnetic field modulated in accordance with the recording data on the magneto-optical disc 2.

The system controller 7, controlling the memory 14 in the above-described manner, controls the recording position for continuously recording the recording data read out in a burst-like manner from memory 14 on the recording track of the magneto-optical disc 2. For controlling the recording position, the recording position of the recording data read out in a burst-like manner from the memory 14 is supervised by system controller 7 and a control signal designating the next recording position on the recording track of the magneto-optical disc is supplied to the servo control circuit 6.

The reproducing system of the disc recording/reproducing apparatus is hereinafter explained.

With the present reproducing system, adapted for reproducing the recording data continuously recorded on the recording track of the magneto-optical disc 2, the recording track of the magneto-optical disc 2 is traced by the optical head 3 with the laser light for reading the recording signals from the magneto-optical disc. Meanwhile, the magneto-optical disc 2 is rotationally driven at the same rotational velocity (constant linear velocity) as that of the standard CD-DA format, so that the recording signals are read in a burst-like manner at the same data transfer rate as that of the standard CD-DA format and converted by RF amplifier circuit 5 before being supplied to the decoder 21.

The decoder 21 is a counterpart of the encoder 15 of the recording system and processes the playback output converted into the binary signals by the RF circuit 5 by subjecting it to de-interleaving, error correction decoding or 14-to-8 demodulation for outputting the above-mentioned ¼ compressed data in a burst-like manner at the data transfer rate which is the same as that of the standard CD-DA format. Meanwhile, the playback data produced by decoder 21 is supplied to a memory 22.

The system controller 7 controls data writing and readout in or from the memory 22, in which the playback data supplied from decoder 21 in a burst-like manner at the same data transfer rate as that of the above-mentioned CD-DA format is recorded. The playback data written in the burst-like manner in the memory 22 is read out continuously at a constant bit rate, that is at a data transfer rate approximately equal to ¼ of that of the above-mentioned CD-DA format.

The system controller 7, controlling the writing/readout of the reproduced data in or from memory 22 as described above, also controls the playback position so that the above-mentioned playback data written in the burst-like manner from memory 22 under control of the system controller 7 may be continuously reproduced from the recording track of the magneto-optical disc 2. For controlling the reproducing position in this manner, the playback position of the playback data read out in the burst-like manner from memory 22 is supervised by system controller 7 and a control signal designating the next reproducing position on the recording track of the magneto-optical disc 2 is supplied to the servo control circuit 6.

The compressed data, obtained as playback data continuously read out from memory 22 at the above-mentioned transfer rate (bit rate) approximately equal to one-fourth of the standard bit rate, is supplied to a decoder 23. The decoder 23 is a counterpart of the encoder 13 of the recording system and reproduces 16-bit digital audio data by data expansion (bit expansion) to four times of the ¼ compressed data. The digital audio data from decoder 23 is supplied to a D/A converter 24.

The D/A converter 24 converts the digital audio data, supplied from decoder 23, into analog signals, so that analog audio output signals $A_{OUT}$ are outputted via low-pass filter 25 at output terminal 26.

Meanwhile, the magneto-optical disc 2, employed for the above-described disc recording/reproducing apparatus, is preferably of a capacity capable of recording 60 to 74 minutes of stereo audio signals. With the above-mentioned ¼ data compression rate, disc capacity on the order of 130 Mbytes is required. The disc is preferably of an outer diameter of 8 cm or less for use in a portable or pocket size recording and/or reproducing apparatus. As for the track pitch and the linear velocity, the track pitch of 1.6 μm and the linear velocity of 1.2 to 1.4 m/s, which are the same as those of the compact disc, are desired. A disc satisfying these requirements is preferably of an outer diameter of 64 mm, an outer diameter of a data recording region of 61 mm, an inner diameter of the data recording region of 28 mm and a center hole diameter of 11 mm. If such a disc is accommodated in a disc caddy that is 68 mm×72 mm and marketed in this state, recording and/or reproduction on or from the disc may be made with a pocket size recording/reproducing apparatus. As for the ranges of the inner and outer diameters of the disc recording region of the disc with which recording and/or reproduction for 72 to 76 minutes under the ¼ data compression mode, the outer diameter may be in the range of from 60 to 62 mm for the inner diameter of 31 mm and in the range of from 71 to 73 mm for the inner diameter of 50 mm.

The basic recording/reproducing operation by the above described disc recording/reproducing apparatus is explained in detail.

The recording data, that is data read out from memory 14, is arranged into clusters or blocks each composed of a predetermined number of, e,g. 32, sectors, and several, e.g. four, linking sectors L1 to L4. For recording a cluster, e.g. the K'th cluster, not only the 32 sectors B0 to B31 for the cluster $C_k$, but three leading sectors and one trailing sector, that is, two run-in block sectors L2, L3 and one sector for sub-data L4 towards the cluster $C_{k-1}$ and one run-out block sector L1, towards the cluster $C_{k+1}$, totalling 36 sectors, are recorded as a unit. These 36 sectors of recording data are transmitted from memory 14 to encoder 15 and there interleaved so that data are scrambled over a distance of 108 frames corresponding to about 1.1 sectors at the maximum. Thus the data within the cluster $C_k$ is confined within the range of the linking sectors L1 to L4 without affecting the other clusters $C_{k-1}$ or $C_{k+1}$. Meanwhile, dummy data such as 0s, are arranged in the sectors L1 to L3, while subsidiary data or sub-data are arranged in the sector L4, for avoiding adverse effects on main data otherwise caused by interleaving. Sector numbers with 8-bit binary numbers (2-place hectadecimal numbers) of 0000 0000 (00H) to 0001 1111 (1FH) are affixed to main data sectors B0 to B31, a sector number 0010 0000 (20H) is affixed to the linking sector L1 and sector numbers 0011 1101 (3DH) to 0011 1111 (3FH) are affixed to L2 to L4. Meanwhile, 36 sectors, inclusive of the linking sectors, may be arranged into one cluster.

By recording on the cluster-by-cluster basis, there is no necessity, to take into account interference with other clusters due to interleaving, so that data processing may be simplified significantly. Besides, if recording data cannot be recorded in a regular manner during recording, due to e.g. defocusing, detracking or the like malfunctions, re-recording may be carried out on the cluster-by-cluster basis. On the other hand, if data reading cannot be made effectively during reproduction, re-reading may be made on the cluster-by-cluster basis.

Meanwhile, each sector or block consists of 2352 bytes, of which 12 synchronization bytes, 4 header bytes and 2336 bytes as data D0001 to D2336 are arrayed in this order starting from the leading end. The 12 synchronization bytes in the sector array (block array) start with the first byte 00H, H denoting a hexagonal number, followed by 10 bytes FFH, followed in turn by the last one byte 00H. The next 4 header bytes consist of address parts for minute, second and block, each consisting of 1 byte, and one byte for mode information. The mode information is mainly used for indicating the CD-ROM modes and the inner structure of the sector shown in FIG. 2 corresponds to mode 2 of the CD-ROM format. CD-I is a standard making use of this mode 2.

Figure 2:
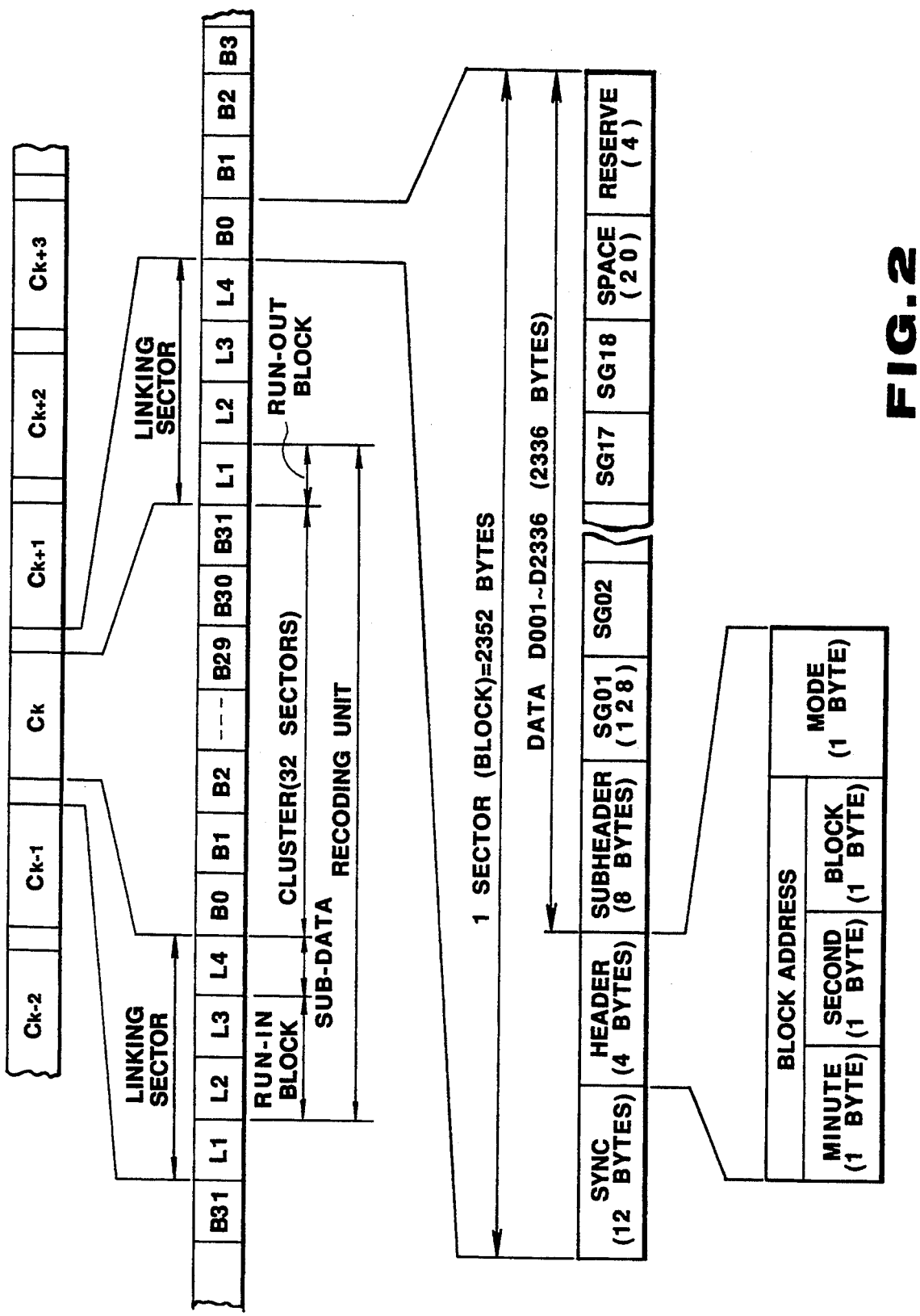
FIG. 2 shows a format of a cluster as a recording unit on a recording medium.

In the example, shown in FIG. 2, the format for recording the compressed audio data is shown, which is an area of the 2336 bytes, consisting of 8-byte sub-headers, 18 sound groups SG01 to SG18 each consisting of 128 bytes, 20 bytes of a space area and a 4-byte reserve area. The 8-byte subheaders are made up of two arrays each consisting of a 1-byte file number, a 1-byte channel number, 1-byte sub-mode and 1-byte data type.

Figure 3:
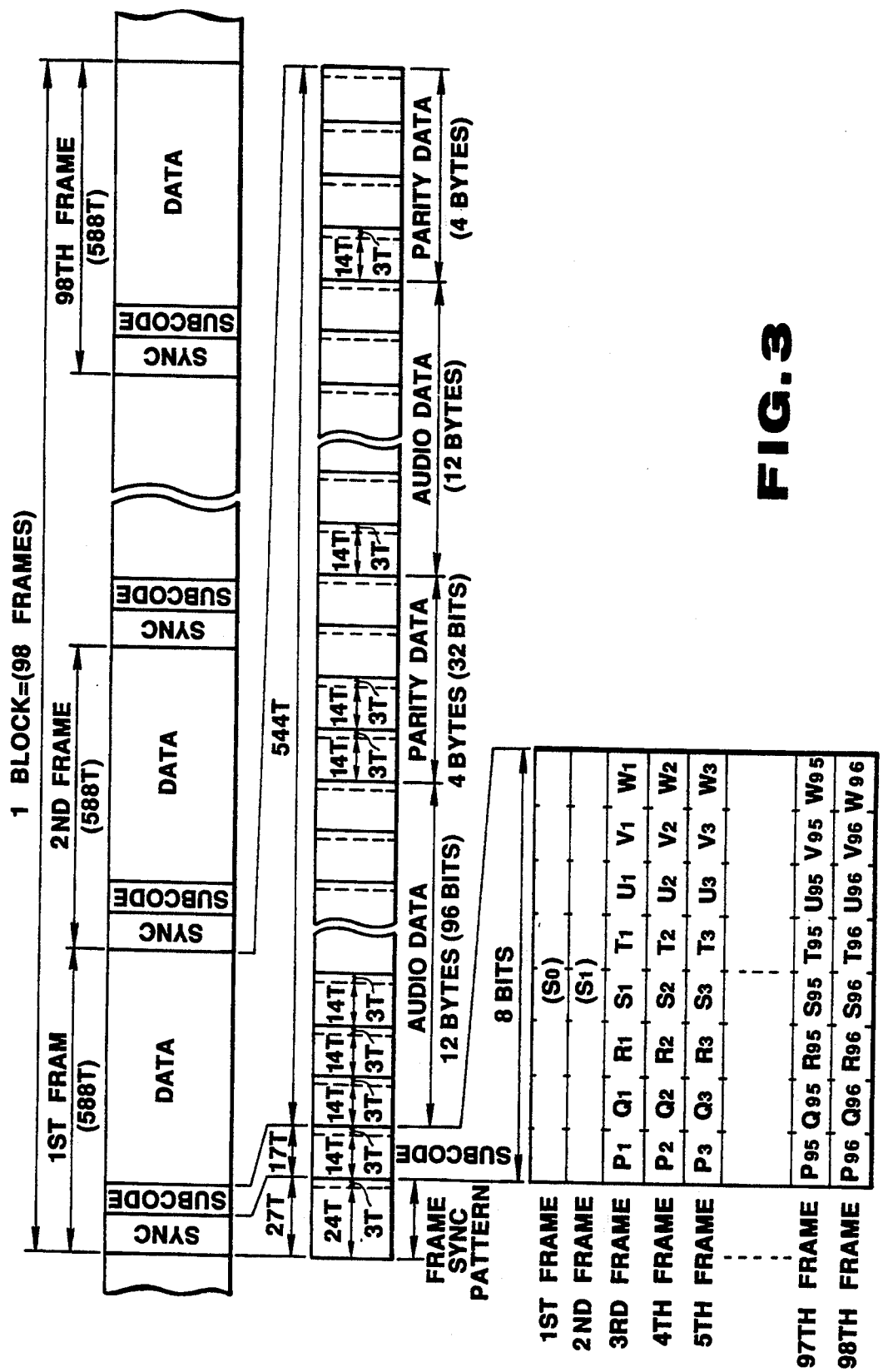
FIG. 3 shows a format of a frame and a sector (block) prescribed in a standard for a compact disc (CD).
Figure 4:
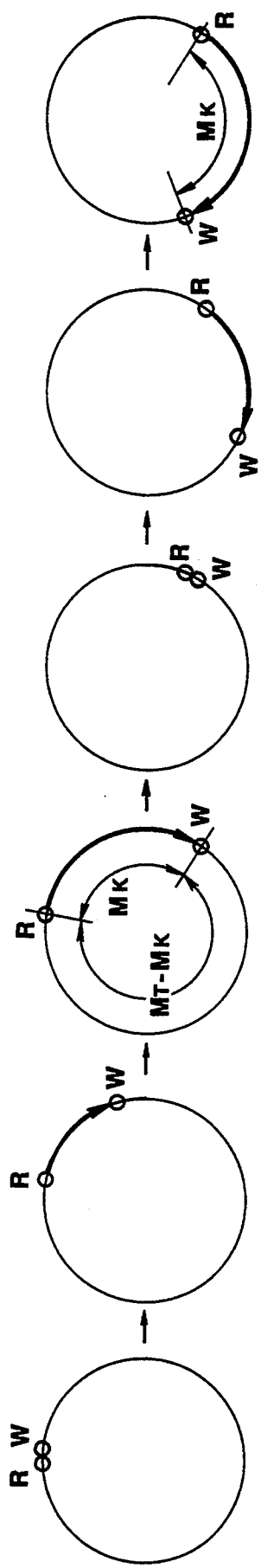
FIG. 4 shows the controlled state of a memory in a recording system of the disc recording/reproducing apparatus shown in FIG. 1.

Meanwhile, when the sector-array data are recorded on the disc, the data are processed by the encoder by being subjected to parity appendage, interleaving and 8-to-14 modulation for performing a recording in accordance with the recording format shown in FIG. 3.

In this figure, one block or sector is made up of 98 frames of first to 98th frames, each frame being 588 times a channel clock period T or 588T. In each frame, there is a frame synchronization pattern of 24T (plus 3 linking bits 3T), a subcode of 14T (plus 3 linking bits) and main data (audio data and parity data) of 544T. The 544T main data are composed of 12 bytes (12 symbols) of audio data, 4 bytes of parity data, 12 bytes of audio data and 4 bytes of parity data, processed with so-called eight-to-fourteen (EFM) modulation. The audio data in each frame is 24 bytes or 12 words (it being noted that one word of the audio sample data consist of 16 bits). The sub-code is produced by EFM of the 8-bit subcode data. The subcode is arrayed in one block consisting of 98 frames, with the respective bits constituting 8 subcode channels P to W. The first and second frames of the subcode are of synchronization patterns $S_0$, $S_1$ violating the EFM rule, with the subcode channels P to W being composed of 96 bits of from the third to the 98th frames.

The above-mentioned audio data are re-recorded after interleaving. During reproduction, the interleaved data are de-interleaved for providing audio data of a data array conforming to the chronological sequence. Instead of these audio data, usual CD-I data may also be recorded.

Meanwhile, in the above-described disc recording-/reproducing apparatus, system controller 7 continuously increments a write pointer W of the memory 14 at a rate conforming to the bit rate of the compressed data to write the compressed data continuously. When the non-read-out data of the compressed data exceeds a predetermined volume $M_k$, system controller 7 increments a read pointer R of the memory 14 in a burst-like manner at a transfer rate conforming to the above-mentioned standard CD-DA format for reading out the compressed data with a predetermined data volume, such as 32 consecutive sectors, as a recording unit. In this manner, it becomes possible to prevent the data volume that can be written without destructing the non-read-out data, that is the recordable data volume, from becoming lower than the predetermined volume $(M_T-M_K)$.

It is noted that the recording data, read out in a burst-like manner from memory 14, may be recorded in a continuous state on the recording track of the magneto-optical disc 2, by controlling the recording position on the recording track of the magneto-optical disc 2. Besides, since a data writing area in excess of a predetermined volume is maintained at all times in the memory 14, input data may be continuously written in the recordable area in excess of the predetermined volume, even though the occurrence of a track jump etc. due to disturbances is detected by the system controller 7 to interrupt the recording operation on the magneto-optical disc 2. A resetting operation may be undertaken in the interim, so that input data can be recorded continuously.

Meanwhile, header time data associated with the physical addresses of the sectors are recorded on the magneto-optical disc 2 by being appended to the compressed data on the sector-by-sector basis. Table-of-contents data indicating the recording area and the recording mode are recorded in a table-of-contents area (TOC area).

Figure 5:
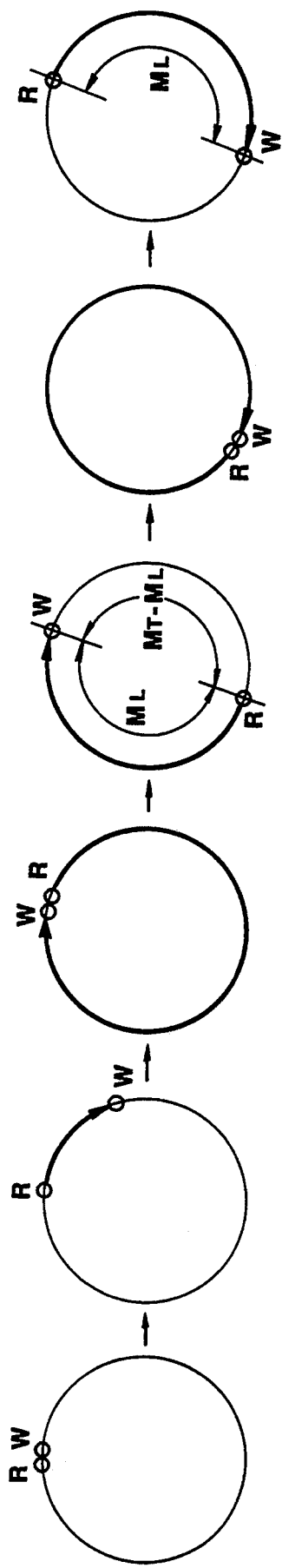
FIG. 5 shows the controlled state of a memory in a reproducing system of the disc recording/reproducing apparatus shown in FIG. 1.

Meanwhile, in the reproducing system of the disc recording/reproducing apparatus, shown in FIG. 1, system controller 7 increments the write pointer W of the memory 22 at a transfer rate conforming to the standard CD-DA format for writing the data in a burst-like manner, while continuously incrementing the read pointer R of the memory 22 at a rate conforming to the bit rate of the compressed data. As shown in FIG. 5, the system controller terminates the writing when the write pointer W has caught up with the read pointer R, that is when the writable area becomes zero, and untakes the writing when the non-read-out volume stored in memory 22 becomes less than the predetermined volume $M_L$. In this manner, the playback data may be continuously read from memory 22 while the volume of the non-read-out data in excess of the predetermined volume $M_L$ is perpetually maintained in memory 22.

By controlling the playback position on the recording track of the magneto-optical disc by the system controller 7, the playback data written in a burst-like manner on the memory 22 may be continuously reproduced on the recording track of the magneto-optical disc 2. Besides, since the non-read-out data in excess of the predetermined volume $M_L$ is always maintained in the memory 22, the non-read-out data may be read out from memory 22 to continue the outputting of analog audio signals, even although system controller 7 detects the occurrence of track jumps etc. due to disturbances or the like to discontinue the reproducing operation from the magneto-optical disc 2, and the resetting operation may be undertaken in the interim.

The present invention is not limited to the above described embodiments. For example, the cluster may be made up of a number other than 32, but may be made up of, for example, 64 sectors. The recordable disc is not limited to the magneto-optical disc, but may also be a phase transition type optical disc, organic dye based optical disc or PHB (photochemical hole burning) type optical disc. The disc-shaped recording medium may also be replaced by a card-shaped or tape-shaped medium.

It will be seen from the above description that the present invention provides a digital audio signal reproducing apparatus adapted for reproducing digital audio data at a constant data rate by reading digital audio signals recorded on a recording medium after bit compression, in which compressed data is read out from the recording medium and written in the memory when the volume of the non-read-out data in the memory becomes lower than the predetermined volume. Data readout from the memory is discontinued when it becomes impossible to write data in the memory to establish a standby state, by way of a memory control, so that, on actuation of a pause key, since the data readout is discontinued, audio reproduction is terminated instantaneously. Even when readout of the recording data from the recording medium proceeds such that data can no longer be written in the memory, data readout from the recording medium is terminated by the above-described memory control to establish the standby state. Since audio playback is re-initiated on releasing the actuation of the pause key, data playback is initiated instantaneously. Since the volume of the non-read-out data is now decreased, data may again be written in the memory, so that data readout from the recording medium may be re-initiated. It is noted that the above-mentioned memory control operation is performed for continuously reproducing data despite malfunctions of the servo system due to disturbances or the like, and the pause function may be realized easily by taking advantage of the memory controlling operation.

What is claimed is:

1. A digital audio signal reproducing apparatus for reproducing digital audio signals continuously recorded on a recording medium, comprising:

reproducing means for sequentially reading recording data from said recording medium at a second transfer rate faster than a first transfer rate required of playback output data, said recording medium being rotationally driven at a constant velocity;

memory means in which the playback data read out by said reproducing means is sequentially written at said second transfer rate and from which the written playback data are continuously read out at said first transfer rate as said playback output data, the memory means being capable of storing a data volume;

playback controlling means for effecting writing control in said memory means so that said playback data of a second predetermined volume is written when the data volume stored in said memory means becomes lower than a first predetermined volume so that a volume of playback data in excess of said first predetermined volume is stored at all times in said memory means, said playback controlling means effecting playback position control so that said playback data sequentially written in said memory means by said writing control is continuously read from the recording track of said recording medium;

key inputting means; and pause controlling means for re-initiating data readout from said memory means responsive to releasing of actuation of said key inputting means.

2. A digital audio signal reproducing apparatus as claimed in claim 1 wherein said second predetermined volume is in excess of a minimum recording unit of the recording data recorded on said recording medium.

3. A digital audio signal reproducing apparatus as claimed in claim 1 wherein said controlling means discontinues writing of playback data when said reproducing means becomes unable to reproduce data, said controlling means re-reading playback data which has once become unable to be reproduced from said recording medium after said reproducing means is reset to a reproducible state, said playback data which has once become unable to be reproduced being written in said memory means in continuation to playback data which has once become unable to be reproduced.

4. A digital audio signal reproducing apparatus as claimed in claim 3 wherein said first predetermined volume is in excess of a volume of playback output data outputted from said memory means during a time interval which elapses in resetting from an unrecordable state to a recordable state.

5. A digital audio signal reproducing apparatus as claimed in claim 1 wherein the playback data read out from said recording medium is compression encoded data.

6. A digital audio signal reproducing apparatus as claimed in claim 4 wherein said second predetermined volume is in excess of a minimum recording unit of the recording data recorded on said recording medium.

7. A digital audio signal reproducing apparatus as claimed in claim 4 wherein the playback data read out from said recording medium is compression encoded data.

8. A digital audio signal reproducing apparatus as claimed in claim 6 wherein the playback data read out from said recording medium is compression encoded data.

9. A digital audio signal reproducing apparatus as claimed in claim 2 wherein the playback data read out from said recording medium is compression encoded data.

10. A digital audio signal reproducing apparatus as claimed in claim 2 wherein said first predetermined volume is in excess of a volume of playback output data outputted from said memory means during a time interval which elapses in resetting from an unrecordable state to a recordable state.

11. A digital audio signal reproducing apparatus as claimed in claim 5 wherein said first predetermined volume is in excess of a volume of playback output data outputted from said memory means during a time interval which elapses in resetting from an unrecordable state to a recordable state.

12. A digital audio signal reproducing apparatus as claimed in claim 3 wherein said second predetermined volume is in excess of a minimum recording unit of the recording data recorded on said recording medium.

13. A digital audio signal reproducing apparatus as claimed in claim 3 wherein the playback data read out from said recording medium is compression encoded data.

14. A digital audio signal reproducing apparatus according to claim 1, wherein the recording medium is disk-shaped.

15. A digital audio signal reproducing apparatus according to claim 8, wherein the recording medium is disk-shaped.

* * * * *